Feb. 16, 1971   W. H. VOGELSBERG ETAL   3,564,372
ELECTRICAL POWER CONTROL MEANS
Filed Nov. 29, 1968   4 Sheets-Sheet 1
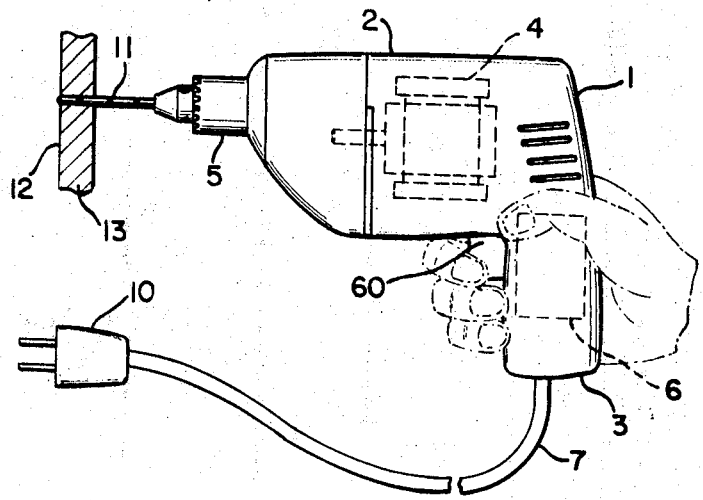
FIG. I
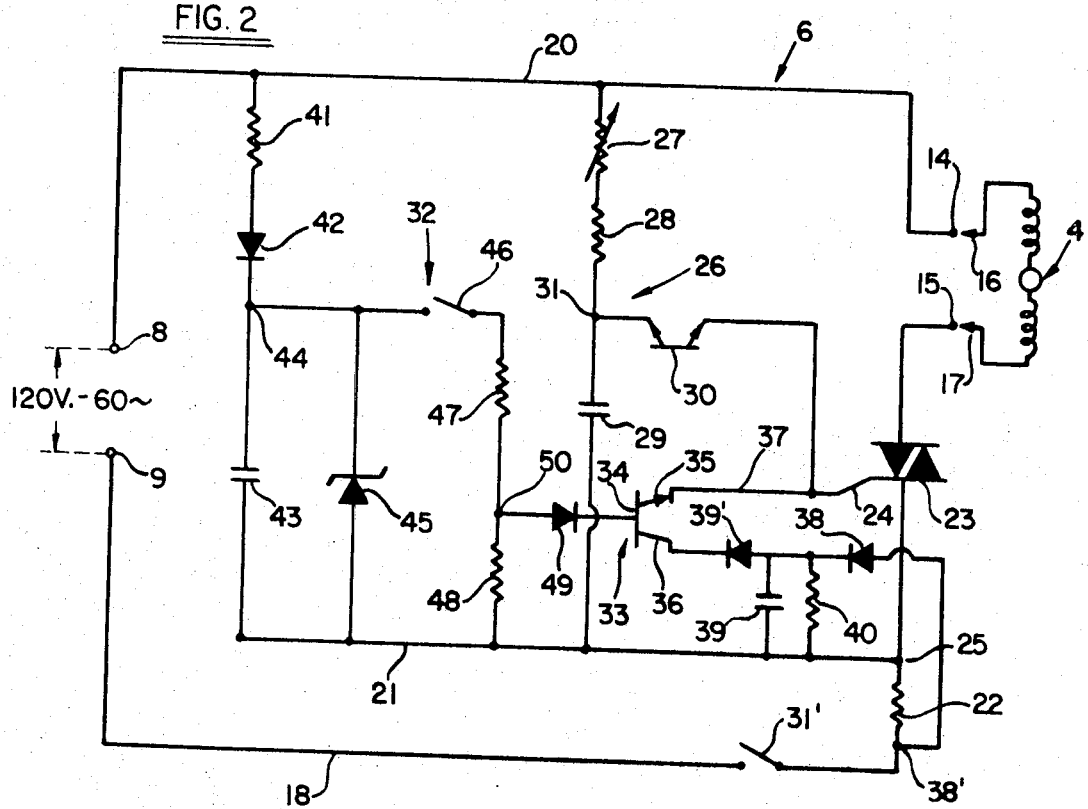
FIG. 2
INVENTORS
WALTER H. VOGELSBERG
BY ALEXANDER C.R. WILSON
Arnold, Roylance, Kruger & Durkee
ATTORNEYS

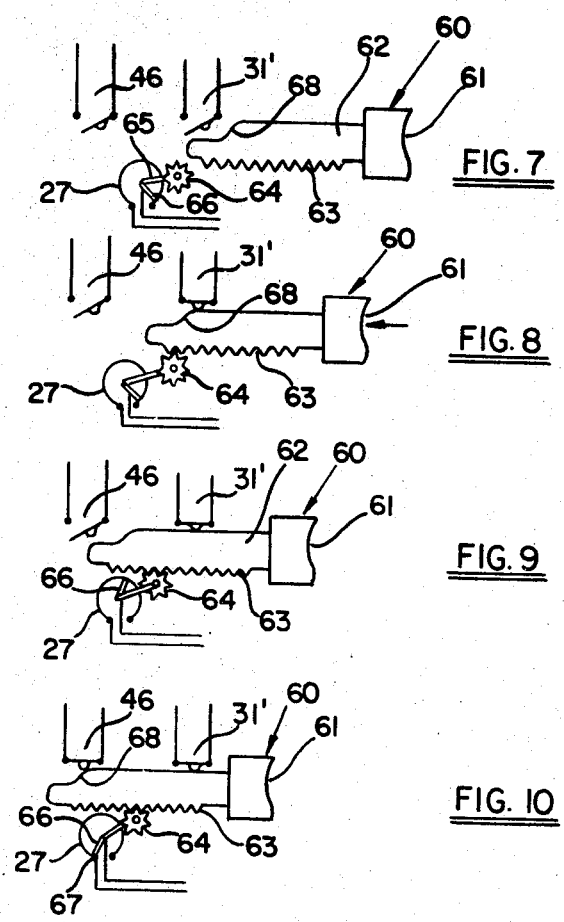
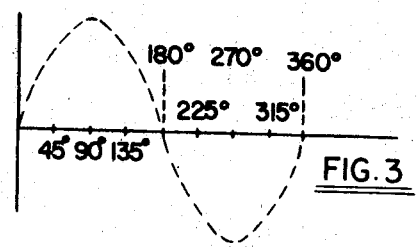
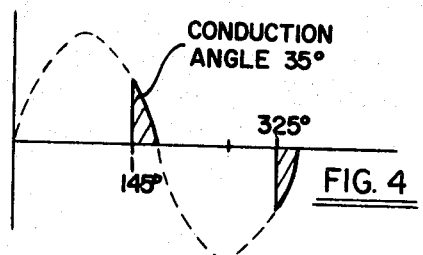
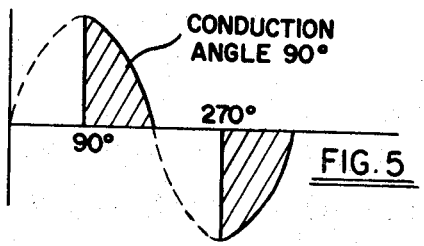
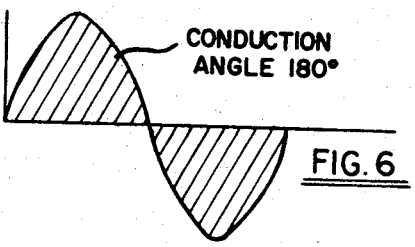

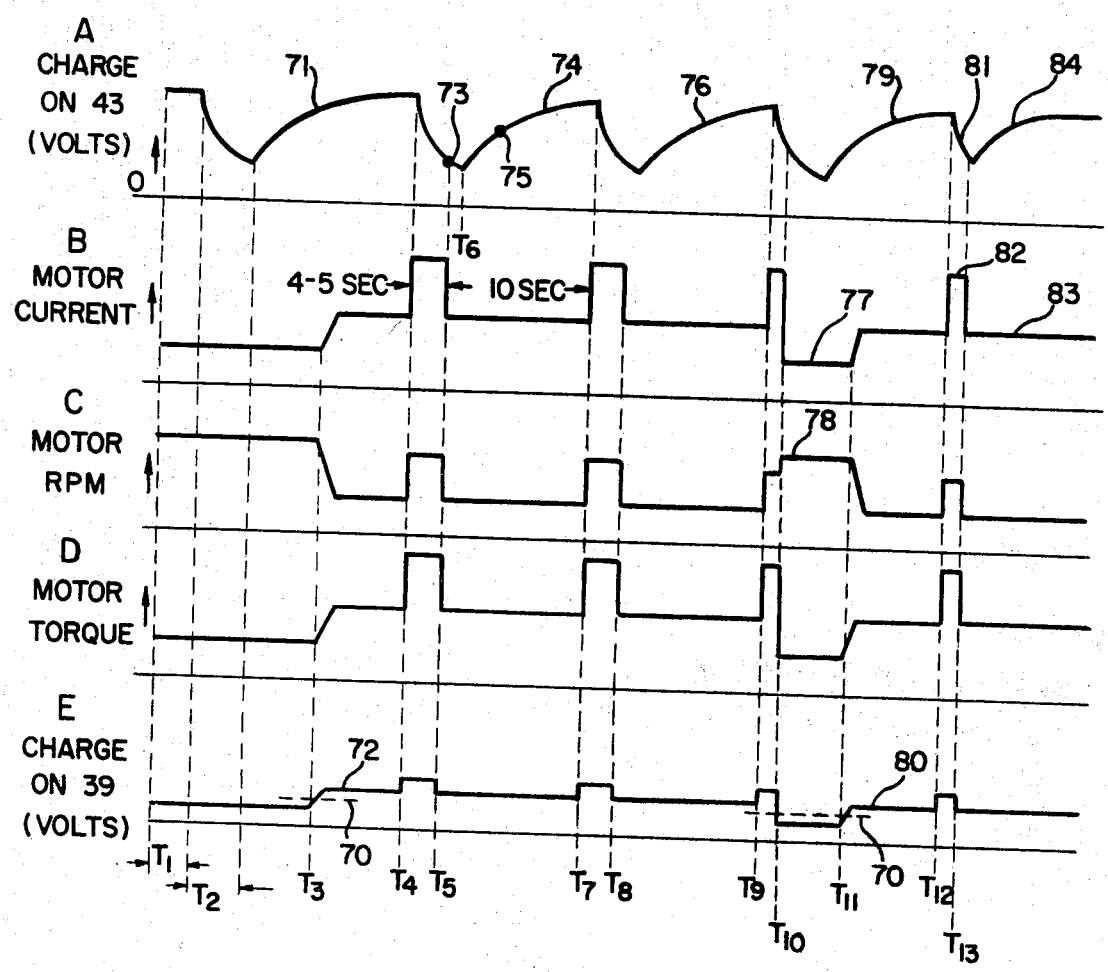

INVENTORS
WALTER H. VOGELSBERG
ALEXANDER C.R. WILSON

BY Arnold, Roylance, Kruger & Durkee
ATTORNEY

United States Patent Office 3,564,372
Patented Feb. 16, 1971

3,564,372
ELECTRICAL POWER CONTROL MEANS
Walter H. Vogelsberg, Radnor, Pa., and Alexander C. R. Wilson, Towson, Md., assignors to The Black and Decker Manufacturing Company, Towson, Md., a corporation of Maryland
Filed Nov. 29, 1968, Ser. No. 779,991
Int. Cl. H02p 7/28
U.S. Cl. 318—345                15 Claims

ABSTRACT OF THE DISCLOSURE

An electrical power control circuit for a load which provides for selective application of power in excess of the normal power to the load. In the preferred embodiment, the load is a motor and the application of additional power is manually controlled and provides greater power output of the motor so a tool powered by the motor will continue to operate even though the load on the tool would normally stall the motor. The additional power is automatically cut back by the control circuit before damage to the motor can occur. In the preferred embodiment, the motor drives a portable power tool and power to the motor is controlled by varying the firing angle of a triac in series with the motor.

---

This invention relates to a selectively operable control circuit to increase the power to an electrical load under predetermined conditions, and to cut back the power to the electrical load before damage to the load occurs.

More specifically, the invention relates to a selectively operable control circuit to increase the power to an electrical load in excess of its rated capacity for a predetermined period of time, but only when the load is in an overload condition.

Still more specifically, the invention relates to a manually operable control circuit for an electric load which is capable of carrying a normal current for extended periods of time, but is incapable of carrying the higher current or power provided by the control circuit for extended periods without damage to the load. In the preferred embodiment, the load is a motor and the higher voltage supplied to the motor from the manually operable control circuit provides an additional short burst of energy to the motor with corresponding increased power output of the motor for a short period of time. Where the load is a motor there is danger of damage to the motor by overheating, and in addition the higher current from the control circuit also causes the speed of the motor to increase above its rated speed with the result that damage to the motor bearings and armature could occur. For this reason, the control circuit of the preferred embodiment is so arranged that the extra current or power burst cannot be supplied to the motor unless the motor is first loaded a predetermined amount. An additional feature of the control circuit is that the extra current or power to the motor ceases immediately when the external load on the motor is reduced below a predetermined level.

The control circuit of this invention has particular utility with an electrical load in the form of a universal motor which drives a power tool, the load characteristics of which frequently demand additional torque for short periods of time. Such additional torque of approximately double the normal torque of the motor can be provided when necessary by the manually operable control circuit of this invention. Such additional torque is particularly useful in the environment of a portable power tool such as an electric drill. For example, where a high speed drill bit is used with the portable drill to drill a hole through iron or steel, the cutting edge of the drill frequently catches just as the point of the drill breaks through the work and the drill motor may stall with the result that it is necessary to back out the drill bit by hand and then try again. Also, when an auger bit is chucked in the portable drill and is used to bore a hole in hard wood, the drill motor may again stall. In both these situations, if additional torque were available the drilling or boring coud be continued without interruption. Such additional torque is obtained when needed, in accordance with this invention, by manually operating the unique control circuit devised by applicants.

In addition to use of the control circuit of this invention with portable power tools such as electric drills, this control circuit also finds utility with other power tools, both portable and stationary in which it is advantageous to have additional torque or power selectively available, and under the control of the operator of the tool.

In the preferred embodiment to be described, the motor is operated from a 120 volt AC power supply. The motor however, is so designed that full rated power is delivered to the motor when the average volt to the motor is substantially less than that of the AC power supply, for example, 73 volts. Alternatively, if the tool is to be used with a 240 volt AC power supply, the motor may have a normal operating voltage of, for example, 146 volts. Connected to the motor is a controlled conduction device controlled by a first control circuit which limits the voltage to the motor to its rated voltage, and a second control circuit manually actuable to increase the voltage to the motor to the full line voltage and which is automatically disabled to cut back the voltage to the normal rated voltage, before damage can occur to the motor. Advantageously, the controlled conduction device is a gate controlled thyristor of the bidirectional conducting type, for example, a triac, or, the equivalent of a triac, namely, a pair of opposed SCR's in parallel relation to each other.

As is well known in the art, both the SCR and the triac have a blocking state and a conducting state. So long as the breakover voltage of the thyristor is not exceeded, a change from the blocking state to the conducting state can be controlled by application of a suitable trigger signal to the gate of the thyristor. As soon as the thyristor switches to its conducting state, the gate is no longer required to maintain the thyristor conducting, and the thyristor remains in the conducting state until commutated to the blocking state by a reduction of current below the holding current required to maintain the thyristor conducting.

As is also well known in the art, the average voltage delivered to a load connected to a source of alternating or pulsating current can be precisely controlled by gating the thyristor on at a predetermined time during each half cycle of or each pulse of the current supply.

In accordance with this invention, the power supply is 120 volts AC, the motor is in series with a triac, and during normal operation of the motor the triac is gated on by a phase control circuit, not earlier than about 90 degrees after the beginning of each half cycle of the alternating current supply. Alternatively, the phase control circuit can be adjustable and can be controlled by a trigger switch of the tool with which the motor is used, to vary the conduction angle of the triac.

The trigger of the tool is advantageously operable to a first position in which the conduction angle of the triac is small, for example, 35 degrees, so the motor runs very slowly. The trigger also has a second fully pulled position in which the overdrive control circuit gates the triac on for a conduction angle of 180 degrees. The trigger is also movable through an intermedaite range in which the resistance of the variable resistor is changed to vary the timing of the phase control circuit, and correspondingly, the conduction angle of the triac. Hence, an initial pull on the trigger turns the tool on and gates the triac on at about 145 degrees after the beginning of each half cycle of alternating current (conduction angle 35 degrees). Movement of the trigger in the intermediate range changes the timing of the gate trigger signal and therefore, provides for manual selection of the conduction angle up to 90 degrees with corresponding speed control of the motor. The fixed resistor in the phase control circuit is so selected that manipulation of the variable resistor by the trigger cannot gate the triac on for more than about 90 degrees. Pulling the trigger to its second or furthest position closes a switch to cause the selectively operable control circuit to gate the triac on at the beginning of each half cycle of the alternating current supply but only when the motor is overloaded a predetermined amount. The additional power to the motor is supplied for only a predetermined period of time, until the load on the motor drops below a predetermined level, or until the trigger switch is released, which ever occurs first. Advantageously, the maximum duration of the overpower to the motor is 2–5 seconds. If the operator releases the trigger switch from its maximum pulled position before the end of this predetermined time interval, the thyristor is again gated on not earlier than about 90°. If the load on the motor drops below a predetermined level while the trigger is in the additional current or overdrive position, the normal phase control circuit again assumes control and gates the triac on not earlier than 90° after the initiation of each half cycle of alternating current. The additional current control circuit includes a timing device which prevents applying another complete additional current cycle to the motor for a predetermined period of time after the termination of a previous additional current cycle.

The selectively operable control circuit of this invention has found particular utility in the environment of a portable electric drill. Initially pulling the trigger of the drill causes the motor to run at a slow speed because the triac is gated on at about 150° after the beginning of each half cycle of supply current. Pulling the trigger further provides variable speed and power up to the normal current carrying characteristics of the motor. When the drill motor is overloaded, as when a drill bit breaks through the rear surface of a workpiece ,pulling the trigger to its maximum extent operates the control circuit so that the triac is gated on at the beginning of each half cycle, with the result that a short burst of extra power is available from the motor. If the operator holds the trigger in the fully pulled position, with the motor overloaded, the motor will be supplied with additional current only for the predetermined 4–5 seconds. If the trigger is released from its maximum pulled position after the end of the 4–5 second interval, pulling the trigger again before the expiration of perhaps another 10 seconds may gate the triac to the additional current condition, depending on the elapsed time between releasing and repulling the trigger. However, the triac will be gated to the additional current condition for less than a complete additional current cycle, for example, for only 1 or 2 seconds. Correspondingly, the motor will receive additional current for less than a complete additional current cycle.

If the trigger is held in the additional current position for less than 4–5 seconds, the control circuit becomes enabled to supply a complete cycle of additional current before the expiration of the normal 10 second delay interval. The triac can be gated fully on to supply additional current to the motor only when the motor is loaded a predetermined amount. Hence, overspeed damage to the motor bearings and armature, should the overvoltage switch be closed while the motor is not loaded, is prevented.

Of course, the variable phase shift feature may be eliminated, whereupon the motor or load is normally gated on at about 90° after the beginning of each half cycle of the AC supply current, and is gated on at the beginning of each half cycle when in the additional voltage mode of operation.

Accordingly, an object of this invention is to provide a control circuit manually operable to increase the power to an electrical load and automatically operable to cut back the power to the load before damage occurs.

Another object of the invention is to provide a selectively operable control circuit to increase the power to an electrical load for a predetermined maximum period of time, but only when the load is already in an overload condition above a predetermined value.

Another object is to provide a selectively operable motor control circuit to increase the power to an electric motor in excess of the rated capacity of the motor for a predetermined maximum period of time, but only when the motor is in an already overloaded condition, so that the motor speed will not exceed a predetermined maximum value.

A further object is an electronic control circuit for a motor including a solid state control element to increase the current to a motor for a predetermined period of time, at the option of the operatior of the motor, but only when the motor is already overloaded a predetermined amount.

A still further object is a control circuit which is manually controllable to provide additional current to a motor for a predetermined period of time, the circuit being so arranged that a complete cycle of additional current cannot again be supplied to the motor until the expiration of a second predetermined period of time, whereupon the maximum duty cycle of the motor controlled by the circuit cannot be exceeded and hence, danger of damage to the motor is eliminated.

A still further object is a motor control which provides additional power to a motor for the same interval of time regardless of the extent of overload on the motor at the time the control circuit is selectively operated.

Another and most significant object of this invention is to provide a control satisfying the above stated objects which is inexpensive, is assembled in a small package, advantageously within the casing or handle of the tool with which the motor is used, and which is sufficiently inexpensive that the increase in cost of a motor driven tool or other load including the control circuit is nominal.

Another significant object is a motor control for a motor designed for optimum performance at a voltage less than the power supply voltage, in which the control normally supplies rated voltage to the motor, and in which the control can be manually actuated to supply the full power supply voltage to the motor but only for a safe period of time.

Numerous other objects of this invention will become apparent with reference to the drawings, which form a part of this specification and in which:

FIG. 1 is a side elevational view of a portable electric drill having a universal motor controlled by the control circuit of this invention;

FIG. 2 is a schematic circuit diagram of one embodiment of the control circuit of this invention;

FIG. 3 shows the alternating current waveform of the power source;

FIG. 4 shows current supplied to the motor at a triac conduction angle of 35°;

FIG. 5 shows current supplied to the motor at a triac conduction angle of 90°;

FIG. 6 shows current supplied to the motor when the triac is gated on very early during each half cycle by the additional current control circuit;

FIGS. 7–10 show schematically the trigger arrangement for the portable electric drill of FIG. 1 with:

Figure 12:
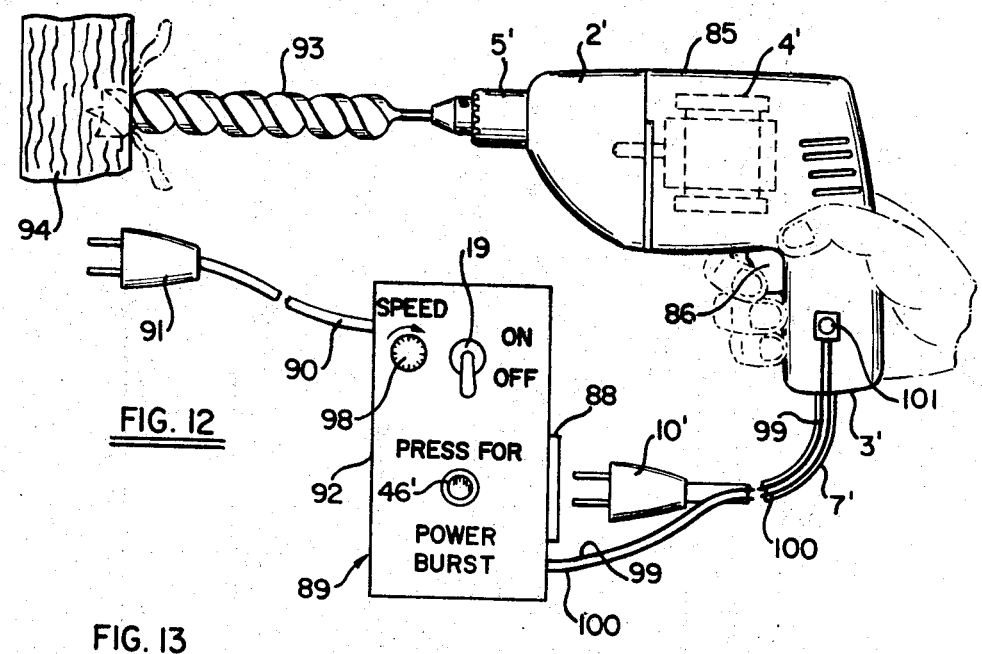
Figure 13:
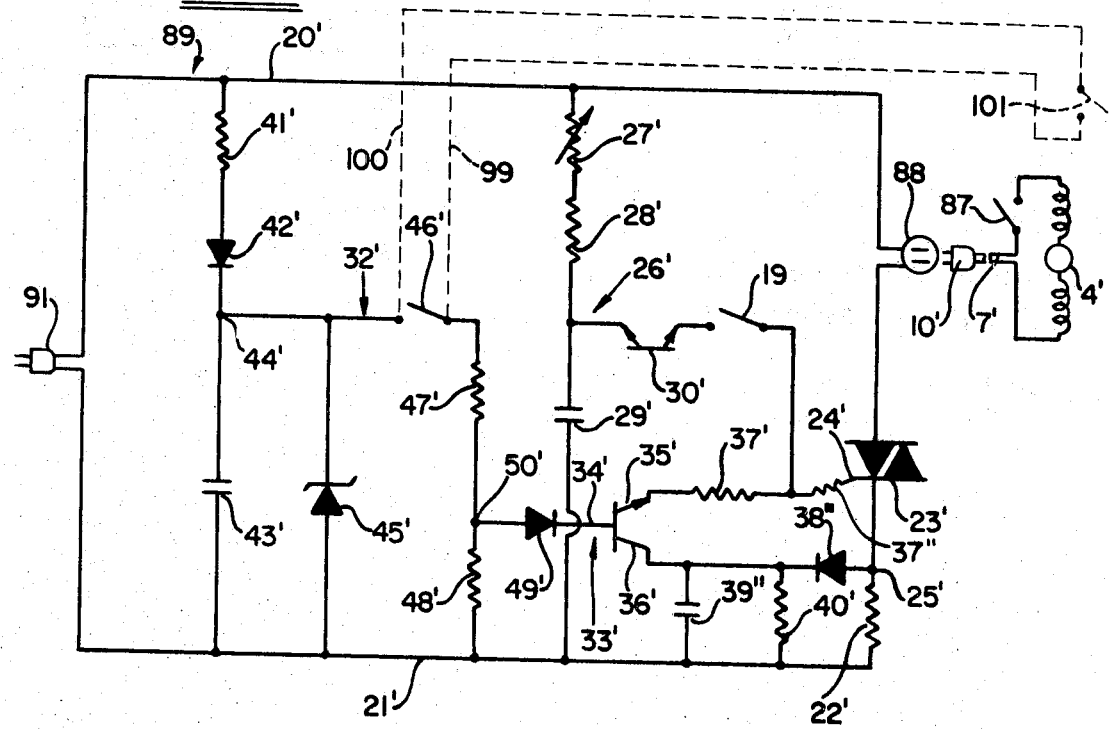

FIG. 7 showing the position of the trigger with the drill motor off,

FIG. 8 showing the trigger position with the drill motor initially on,

FIG. 9 showing an intermediate position of the trigger for variable speed control, and FIG. 10 showing the overcurrent control switch operated;

FIG. 11 is a graphical representation of various characteristics of the motor and components of the current control circuit at certain operating conditions;

FIG. 12 is a side elevational view of a portable electric drill having a universal motor controlled by a second embodiment of control circuit of this invention; and FIG. 13 is a schematic circuit diagram of the second embodiment of the control circuit of this invention.

Referring now to the drawings in detail, and particularly to FIG. 1, there is shown a portable electric drill 1 having a casing 2 including a handle portion 3 by which the drill can conveniently be held in the hand of the user. The drill is powered by a universal motor 4 located within casing 2 and which drives the chuck 5 of the drill through the customary reduction gear train (not shown).

Handle 3 is hollow and contains a packaged control circuit 6 for motor 4 of the drill. A line cord 7 extends into the handle and is connected to input terminals 8 and 9 of control circuit 6. At the other end of the line cord is the usual two-prong plug 10 which permits connecting the drill to the 120 volt AC power supply. Where drill 1 is of the so-called "double insulated type," two prong plug 10 is provided. Alternatively, the plug may be of the three prong type (not shown) including a ground prong connected to casing 2 via a third wire (not shown) in cord 7. Where the three prong grounded plug is used, the plug is so arranged that line 20 connects to the neutral terminal of the power supply socket.

As shown at FIG. 1, a drill bit 11 held by chuck 5 is just about to break through the rear surface 12 of metal workpiece 13. As the point of drill bit 11 breaks through surface 12, the cutting edges of the bit tend to grab and there is a tendency for motor 4 to stall because of the heavy load imposed on the bit. By virtue of the unique operation of control circuit 6, additional power can be selectively supplied to the drill motor at the option of the operator, to provide additional torque to drill through workpiece 13.

Advantageously, circuit 6 is packaged so it will fit within the handle 3 of drill 1, as shown at FIG. 1. In addition to input terminals 8 and 9, the packaged circuit has output terminals 14 and 15. Universal motor 4 has the usual field windings and armature, and has terminals 16 and 17 which are connected respectively across output terminals 14 and 15 of control circuit 6.

As shown at FIG. 2, input terminal 8 of circuit 6 is connected to output terminal 14 by line 20. Input terminal 9 is connected to output terminal 15 via the series circuit of line 18, ON-OFF switch 31', sensing resistor 22, and a solid state controllable conduction device in the form of a triac 23. Triac 23 has a gate electrode 24, a first anode (usually referred to as anode 1) which is connected to sensing resistor 22 at junction 25 and a second anode (usually referred to as anode 2) which is connected to output terminal 15. With motor 4 connected to output terminals 14 and 15, as shown at FIG. 2, it is apparent that resistor 22 and triac 23 are in series with the fields and armature of motor 4.

A first gate trigger circuit 26, in the form of a phase control circuit, is connected to gate 24 of the triac. Gate trigger circuit 26 includes a variable resistor 27, a fixed resistor 28 and a capacitor 29 connected in series across line 20 and a line 21 extending from junction 25. One terminal of a trigger diac 30 is connected to junction 31 between resistor 28 and capacitor 29, and the other terminal of diac 30 is connected to gate 24 of the triac. Diac 30 is a bidirectional conducting device which becomes conducting when the voltage across it exceeds its breakover value. Resistors 27 ands 28 and capacitor 29 form a phase control circuit which gates the triac during normal operation of motor 4. By way of illustration, motor 4 is a 60–80 volt motor which draws its rated current when the triac is gated on for instance, about 90° of each half cycle of the AC supply. Since motor 4 could overheat, or overspeed, if the conduction angle of triac 23 is greater than about 90° for a considerable period of time, fixed resistor 28 is so selected that the time constant of the RC circuit including resistor 28 and capacitor 29 is such that the triac will not receive a gate trigger signal from trigger circuit 26 substantially earlier than about 90° after the beginning of each half cycle of alternating current regardless of the adjustment of variable resistor 27. Variable resistor 27 can, however, vary the conduction angle throughout the remainder of the half cycle.

There is also a second gate trigger circuit 32 connected to gate 24 of the triac. This gate trigger circuit includes an NPN transistor 33 having a base 34, emitter 35, and collector 36. Emitter 35 is connected to gate 24 of the triac by line 37. The anode of a diode rectifier 38 is connected to junction 38' between resistor 22 and switch 31', and its cathode is connected to the anode of a diode rectifier 39' which has its cathode connected to collector 36. A collector biasing capacitor 39 is connected between the cathode of diode 38 and line 21. In shunt with capacitor 39 is a resistor 40.

Second gate circuit 32 also includes a timing circuit having a resistor 41, a diode rectifier 42 and a capacitor 43 connected in series across lines 20 and 21. The anode of diode rectifier 42 is connected to resistor 41 and the cathode of diode rectifier 42 is connected to capacitor 43 at junction 44. In shunt across capacitor 43 is a Zener diode 45 which limits the voltage at junction 44. Connected across junction 44 and line 21 is a series circuit including a manually operable control switch 46, a resistor 47 and a resistor 48. The anode of a diode rectifier 49 is connected to junction 50 between resistors 47 and 48. The cathode of diode 49 is connected to base 34 of transistor 33.

The normal operation of motor 4 will now be explained. During normal operation of the motor at no load or low load, the power to the motor is controlled by phase control circuit 26 which controls the conduction angle of triac 23. During each half cycle of alternating current when line 20 is positive, the plate of capacitor 29 connected to junction 31 is positively charged through resistors 27 and 28. The time constant of the circuit including capacitor 29 is such that the voltage at junction 31 causes diac 30 to break over and conduct and trigger the triac on not earlier than about 90° after the beginning of a positive half cycle. When line 20 is negative, the plate of capacitor 29 connected to junction 31 is negatively charged and a negative gate trigger signal is applied to gate 24 of the triac when diac 30 breaks over, which again occurs not earlier than 90° after the beginning of the negative half cycle. Triac 23 is of course, of the type which can be gated on by both positive and negative trigger signals. Where the AC supply has the waveform shown at FIG. 3, gate trigger circuit 26 triggers the triac on for about 90° (variable resistor 29 adjusted to zero ohms) during each half cycle of the alternating current. For convenience of illustration, 90° is shown at FIG. 5.

Referring now to FIGS. 1 and 7, there is shown a trigger switch arrangement including a trigger 60. Portable electric dill 1 is controlled by manually manipulating trigger 60. As shown at FIGS. 7–10, trigger 60 is mounted for rectilinear movement. Trigger 60 is elongated and includes a finger engaging portion 61 for engagement by the finger of the user of the tool. The lower edge of elongated portion 62 has rack gear teeth 63 which mesh with the teeth of a pinion gear 64. Pinion gear 64 is fixed to the operating shaft 65 of variable resistor 27. When pinion 64 is rotated, the position of slider 66 is changed and varies the resistance of variable resistor 27.

With slider 66 in the position of FIG. 7, the resistance of resistor 27 is at its maximum. As pinion 64 is rotated counterclockwise, the value of the resistance decreases, until the slider 66 reaches the terminal 67, as shown at FIG. 10, whereupon the resistance of resistor 27 is essentially zero.

Trigger 60 has a switch operating cam 68. Mounted in the path of travel of cam 68 are switches 31' and 46, which are the same switches described in FIG. 2.

FIG. 7 shows trigger 60 in the position it occupies when the motor is off. To turn the motor on, the operator pulls trigger 60 to the position of FIG. 8, whereupon ON-OFF switch 31' is closed by cam 68, and rack teeth 63 engage the teeth of pinion 64. In this position, the value of resistor 27 is at its maximum and triac 23 is gated on for only about 35° during each half cycle as shown at FIG. 4. Motor 4 now runs at a very low speed.

As trigger 60 is pulled further to the position of FIG. 9, the position of slider 66 is changed and the resistance of resistor 27 decreases. As the value of resistor 27 decreases, the time constant of phase control circuit 26 decreases and triac 23 is gated on earlier during each half cycle of the alternating current. With trigger 60 in the position of FIG. 9, the triac is gated on at a time during each half cycle somewhat later than 90° so that the conduction angle of the triac is perhaps 50°.

As trigger 60 is moved toward the position of FIG. 10, in which slider 66 engages stop contact 67, the conduction angle of triac 23 increases until this conduction angle is approximately 90° as shown at FIG. 5. However, before slider 66 engages terminal 67, cam 68 engages and closes overvoltage control switch 46. When switch 46 is closed, triac 23 is gated on for full conduction as shown at FIG. 6, but only if the motor is overloaded a predetermined amount. Such over-current is supplied to the motor for only several seconds, in a manner which will subsequently be described in detail. Trigger 60 has the usual return spring (not shown) which automatically returns the trigger to the position of FIG. 7, when the trigger is released.

OPERATION OF FIG. 2 CIRCUIT

When motor 4 is heavily loaded, such as when the tip of drill bit 11 breaks through the rear surface 12 of work piece 13, it is desirable to be able to substantially increase the torque and power available from motor 4. This increased power is obtained by closing switch 46 to gate triac 23 on very early during each half cycle of the AC supply. When second gate circuit 32 is activated by closing switch 46, the second gate circuit overrides the phase control circuit 26 by supplying the gate trigger signal earlier during each half cycle of the alternating current so that full line voltage is impressed on the motor. However, to eliminate the danger of damage to the motor due to overspeed, the second gate circuit is so arranged that it cannot trigger triac 23 unless motor 4 is overloaded a predetermined amount.

The operation of second gate circuit 32 will now be explained. For purposes of explanation, assume that switch 31' is closed and that the motor is running at no load. During each half cycle of alternating current when line 20 is positive, capacitor 43 receives a positive pulse of voltage through resistor 41 and diode rectifier 42 so junction 44 is positive. When the voltage across capacitor 43 reaches a predetermined value, Zener diode 45 breaks over to maintain the voltage across capacitor 43 at the Zener value. The time constant of resistor 41 and capacitor 43 is such that it takes about 10 seconds for the capacitor 43 when discharged, to charge to the breakover value of Zener diode 45.

With capacitor 43 charged, closing switch 46 applies a positive signal to the base 34 of transistor 33. However, the transistor will conduct sufficient current to trigger triac 23 on only when the voltage across capacitor 39 is great enough. During each half cycle of the alternating current when junction 38' is positive, the upper plate of capacitor 39 is positively charged through diode 38 to the value of the voltage drop across resistor 22. Hence, the voltage across capacitor 39 becomes great enough to provide the necessary collector-emitter bias and the current to trigger the triac on only when the motor is loaded so the voltage across sensing resistor 22 and the charge on capacitor 39 is of sufficient magnitude. Diode 39' constitutes a blocking diode and prevents back flow of current.

Resistor 40 allows capacitor 39 to discharge. However, the time constant of capacitor 39 and resistor 40 is such that it takes a time equal to several cycles of the alternating current supply for the capacitor to discharge.

The explanation of the operation of gate circuit 32 to trigger triac 23 on for substantially full conduction will be explained with reference to FIGS. 2 and 11. With switch 31' closed and the motor running at no load, the motor current, r.p.m., and torque, and the charge on capacitor 43 and 39 are as shown during the time interval $T_1$ of FIG. 11. It will be observed with reference to FIG. 11A that during $T_1$ the charge on capacitor 43 is high, motor current is low, motor r.p.m. is high, motor torque is low, and the charge on capacitor 39 is low, and below the critical value 70 required to cause transistor 33 to pass sufficient current to trigger the triac on. If, at the beginning of time interval $T_2$, switch 46 is closed, capacitor 43 will discharge through the base 34 of transistor 33. The transistor will then be rendered slightly conducting, but insufficient current will pass through the transistor to trigger triac 23 on. Hence, even though switch 46 is closed, triac conduction is still controlled by the gate control circuit 26.

At the end of time interval $T_2$, switch 46 is opened and capacitor 43 again charges to its maximum value along curve 71. At time $T_3$ a load is imposed on the motor. As a result, motor current increases, motor r.p.m. decreases, motor torque increases, and the voltage drop across resistor 22 increases with the result that the charge on capacitor 39 also increases. The charge on capacitor 39 is now at a level 72 (FIG. 11-E) which is above the critical value 70, and hence, if switch 46 is closed, the transistor will conduct sufficiently to gate the triac on at essentially the beginning of each half cycle of alternating current.

At time $T_4$ (motor loaded), switch 46 is closed and the charge on capacitor 43 is thus applied to the base of transistor 33 through diode 49. The level 72 of the voltage across capacitor 39 is great enough to cause diode 39' to conduct and to provide the necessary collector to emitter bias to cause transistor 33 to conduct sufficient current to gate the triac on. The current to gate the triac on is that stored on capacitor 39. Sufficient charge remains on the capacitor 39 to apply a positive trigger signal to the gate of the triac during the time interval when junction 38' is negative. This charge on capacitor 39 is maintained because during the next positive half cycle of alternating current at junction 38' (motor loaded), diode 38 passes a positive pulse of current to recharge capacitor 39 and hence, the triac will be gated on continuously, so long as base bias is maintained on the transistor. Hence, when switch 46 is closed at time $T_4$, the triac is triggered on for substantially full conduction and the motor current, motor r.p.m., and motor torque increase substantially.

Advantageously, the motor current is substantially doubled when triac 23 is triggered full on. The short length of time transistor 33 remains conducting, for example, 4–5 seconds, is determined by the time constant of capacitor 43 and a network including resistors 47 and 48. The various circuit components of second gate circuit 32 are so selected that transistor 33 becomes non-conducting while the charge on capacitor 43 is still on the knee of the capacitor discharge curve as shown at 73, FIG. 11–A. When the charge on capacitor 43 reaches the level 73, at time $T_5$, transistor 33 no longer conducts sufficient current to trigger the triac 23. Then, the triac is again triggered by phase control circuit 26 and the current to the motor is cut back.

To recharge capacitor 43 it is first necessary to open switch 46. When the switch is opened at time $T_6$, capacitor 43 again charges through resistor 41 and diode 42 to the Zener voltage, as shown graphically at 74. At time $T_7$, capacitor 43 is again charged to the breakover voltage of Zener diode 45, and closing switch 46 will again provide an additional burst of current to the motor for a short period of time. If switch 46 is closed before capacitor 43 is charged to substantially its full value, for example, when the charge on capacitor 43 reaches the level 75, transistor 33 will still conduct sufficiently to trigger the triac full on but capacitor 43 will be discharged over a shorter time duration (for instance, 1 or 2 seconds) and thus, the motor receives only a partial cycle or additional current, not the full cycle of additional current provided previously. Hence, the operator of the tool cannot again heavily overload the motor with a full 4–5 second cycle of additional current unless he first waits approximately 10 seconds for capacitor 43 to charge to the level determined by the Zener diode. Where the operator of the tool waits the full required 10 seconds for capacitor 43 to charge and then again closes switch 46 at time $T_7$, a full cycle burst of additional current will be available to the motor during the 4–5 second time interval from $T_7$ to $T_8$.

After time $T_7$, assume that switch 46 is again opened and that capacitor 43 again charges as shown graphically at 76. When additional power is again required from the motor, switch 46 is closed at time $T_9$. Since the motor is still heavily loaded the charge on capacitor 39 is thus still above the critical level 70 required to cause transistor 33 to conduct sufficiently to trigger triac 23 on, additional current is supplied to the motor during the time interval $T_9$–$T_{10}$. At $T_{10}$, however, the load on the motor is suddenly reduced to its no-load value, as for example, when a drill bit passes completely through the work piece. As soon as the load is removed from the motor, the voltage drop across sensing resistor 22 decreases and capacitor 39 discharges through resistor 40. Such discharging occurs in a time equal to only several cycles of the AC current. Since there is no longer sufficient voltage drop across sensing resistor 22 to replenish the charge on capacitor 39, the charge is quickly depleted with the result that there is insufficient current flow through the transistor 33 to gate 24 of the triac to gate the triac on. Hence, the motor current immediately drops to the no-load level 77 and motor torque also drops immediately. However, because the load on the motor is reduced, the r.p.m. of the motor increases to the no-load level 78.

Shortly after time $T_{10}$, switch 46 is again released and capacitor 43 charges as shown at 79. At time $T_{11}$ the motor is again loaded so that the charge 80 on capacitor 39 again is greater than the critical value 70.

Now consider what happens if switch 46 is closed, but is released before capacitor 43 discharges, for example, after two seconds. As shown at curve A, FIG. 11, capacitor 43 discharges as at 81 when switch 46 is closed at $T_{12}$. Transistor 33 is turned on and triggers the triac on early during each half cycle. Thus, motor current increases to the over-current level 82. When switch 46 is opened at time $T_{13}$ (two seconds after it was closed), current to the motor immediately drops back to level 83 and the motor r.p.m. and torque correspondingly decrease. However, capacitor 43 is only partially discharged, and hence, charges as at 84 to its maximum charge level in less time, for instance, 5 seconds, instead of the 10 seconds normally required. Hence, the operator can apply a full cycle of additional current without first waiting the usually required 10 seconds. There is, however, no danger of damaging the motor because its maximum duty cycle is not exceeded.

In view of the foregoing, it will be apparent that the circuit of FIG. 2 accomplishes the following:

(1) Phase control circuit 26 provides variable speed control for the motor within predetermined limits.

(2) Second gate control circuit 32 does not provide additional current to the motor unless the load on the motor is above a predetermined value.

(3) When the motor is overloaded and switch 46 is closed, a complete cycle burst of additional current of perhaps 4–5 seconds duration is received by the motor. A full cycle of additional current cannot again be applied to the motor for a period of approximately 10 seconds, the time required for capacitor 43 to fully charge again.

(4) Additional current to the motor is immediately cut back when the load on the motor decreases below a predetermined value, or when the switch 46 is opened, whichever occurs first.

Hence, it is apparent that additional current can be applied to the motor of manual actuation of the control circuit only when the motor is overloaded a predetermined amount, and then only for a predetermined period of time. A complete cycle of additional current cannot again be provided to the motor for a second predetermined period of time. The additional current is immediately cut back when switch 46 is opened or when the load on the motor drops below a predetermined value, whichever occurs first. The fact that the additional current can be supplied only when the motor is initially overloaded prevents overspeed damage to the bearing and armature.

SECOND EMBODIMENT OF CONTROL CIRCUIT

FIGS. 12 and 13 show a second embodiment of the control circuit of this invention. As shown at FIG. 12, there is a portable electric drill 85 having a casing 2', a handle 3', a universal motor 4' within the casing, and a chuck 5' driven by motor 4'. The drill has a trigger 86 arranged to operate an ON–OFF switch 87 (FIG. 13). Connected to the terminals of motor 4' and extending from handle 3' is a line cord 7' with a plug 10' at its end. Plug 10' is adapted to be plugged into the socket 88 of a packaged control circuit 89 which forms the second embodiment of the control circuit of this invention. A cord 90 and plug 91 extend from and are connected to the input terminals of control circuit 89. Mounted on control circuit housing 92 are an ON–OFF switch 19 and a power burst control switch 46'. Plugs 10' and 91 can, of course, be of the three prong type including a ground prong, and the plugs are then so arranged that line 20' is connected to the neutral or grounded wire of the power supply.

Chucked in chuck 5' is an auger bit 93 which, as shown at FIG. 12, is boring a hole in the wood block 94. When a large diameter auger, such as auger 93 is used to bore wood block 94, substantial torque and power is required to drive the auger. With the usual small size portable electric drill, it is not unusual for auger 93 to stall with the result that the chuck must be turned in a reverse direction by hand to free the auger. The control circuit 89 provides additional power to motor 4' (a 73 volt motor) when switch 46' is depressed or closed so that auger 93 will be driven through wood block 94 to complete the drilling operation, without stalling.

The motor 4' is identical to the motor 4 previously described and advantageously is designed to provide optimum performance at a voltage of 73 volts. A switch 87, provided within the drill, is operated by manipulating trigger 86. The power burst switch 46', located on box 92 can, for example, be manipulated by the foot of the user of drill 2' to supply additional energy to the drill motor.

Referring to FIG. 13, control circuit 89 is quite similar to control circuit 6, previously described with reference to FIG. 2. There are, however, differences between these circuits which will now be discussed. First resistors 37' and 37'' are connected in series between emitter 35' and gate 24'. Next, ON-OFF switch 19 is connected between diac 30' and the junction of resistors 37' and 37''. Hence, current is supplied to the two control circuits whether switch 19 is open or closed, but triac 23' can be gated to conduct current to the motor only when switch 19 is closed. Although sensing resistor 22' is in series with triac 23' and motor 4', conductor 21' is connected directly to the AC power supply. In addition, the anode of rectifier diode 38'' is connected to junction 25', which is between triac 23' and sensing resistor 22', in circuit 89. Therefore, when motor 4' is loaded there is a voltage drop across sensing resistor 22', as measured between line 21' and junction 25', and capacitor 39'' charges to the value of this voltage drop.

Circuit 89 of FIG. 13 also has a variable resistors 27' in phase control circuit 26'. However, the resistance of this resistor is controlled by a control knob 98 mounted on control box 92.

While there are differences between the circuit arrangement of FIGS. 2 and 13, these two circuits operate in substantially the same manner. In operation of the circuit of FIG. 13, plug 10' of the drill is plugged into the socket 88 of the circuit. Then, switch 19 is closed and ON-OFF operation of the drill can then be controlled by manipulating trigger 86 to open and close switch 87. If it is desired to vary the running speed of motor 4', it is merely necessary to adjust speed control knob 98 which varies the resistance of variable resistor 27' and correspondingly changes the conduction angle of triac 23'.

When it is desired to provide additional current to the motor, such additional current is again only available when the load on the motor is above a predetermined amount so that there is sufficient voltage drop across sensing resistor 22' to charge capacitor 39'' to a sufficient value that current sufficient to gate the triac on will be passed by transistor 33' when power burst switch 46 is closed.

Where it is desired to be able to control the additional current or second gate circuit 32' from the tool, jumper leads 99 and 100 can be connected across switch 46' and a manually operable control switch 101 can then be mounted on the handle 3' of drill 2' at a location convenient to the operator. Advantageously, leads 99 and 100 will extend along line cord 7' and an additional plug and mating receptacle (not shown) can be provided at housing 92 to facilitate connecting the drill handle mounted switch 101 in shunt across power burst switch 46'.

The various components of the circuit arrangement of FIG. 2 are:

| | |
|---|---|
| Triac 23 | SC40B (G.E.). |
| Transistor 33 | 2N3704. |
| Diac 30 | ST-2 (G.E.). |
| Diodes 38, 39', 42, 49 | 1N2071. |
| Zener diode 45 | 1N3020B. |
| Resistors: | |
| 22 | 0.25 ohm. |
| 27 | 100K potentiometer. |
| 28 | 91K. |
| 40 | 10K. |
| 41 | 270K. |
| 47 | 10K. |
| 48 | 10K. |
| Capacitors: | |
| 29 | 0.1 mfd. |
| 39 | 250 mfd. |
| 43 | 100 mfd. |

The various components of the circuit of FIG. 13 are:

| | |
|---|---|
| Triac 23' | SC40B (G.E.). |
| Transistor 33' | 2N2405. |
| Diac 30' | ST-2 (G.E.). |
| Diodes 38'', 42', 49' | 1N2071. |
| Zener diode 45' | 1N3020B. |
| Resistors: | |
| 22' | ½ ohm. |
| 27' | 100K variable. |
| 28' | 3.3K. |
| 37' | 270 ohm. |
| 37'' | 270 ohm. |
| 40' | 10K. |
| 41' | 330K. |
| 47' | 4.7K. |
| 48' | 14.7K. |
| Capacitors: | |
| 29' | 0.1 mfd. |
| 39'' | 100 mfd. |
| 43' | 100 mfd. |

While two preferred embodiments of the motor control circuit of this invention have been shown and described in detail, it is to be understood that numerous changes can be made in the circuit arrangements disclosed without departing from the intended scope of this invention. For example, a pair of SCR's arranged in opposed paralleled relation can be used in lieu of a triac, provided appropriate changes are made in the gate circuitry. In addition, while preferred conduction angles for the triac have been described as from 0-90 degrees for the phase control circuit, and full conduction when the current control circuit is operated, it is to be understood that any combinations of phase control conduction angles and overvoltage conduction angles can be used without departing from the scope of this invention.

It is also to be appreciated that the circuit of FIG. 2 can be used for any application suitable for the circuit of FIG. 13, and that these circuits can be used in all the applications described herein in place of each other.

What is claimed is:
1. A load control comprising:
an electrical load rated for continuous operation at a predetermined first power level;
a power source providing a recurring pulse of current and capable of energizing the load at a second power level greater than said first power level;
control circuit means including a triac connected between said load and power source, said control circuit means also including:
a first manually operable switch to gate said triac on for less than the duration of each pulse of current from the power source to operate the load at said first power level; and
a second manually operable switch to gate said triac on for substantially the duration of each pulse of current from the power source to operate the load at a power level substantially greater than said first power level; and
means to automatically prevent said control circuit means from delivering power to said load at said substantially greater power level for sufficient time to damage said load.

2. Load control means comprising:
a current source at a given voltage;
a load;
first manually operable means for selectively energizing the load at an effective voltage lower than said given voltage;
circuit means for energizing the load at said given voltage for only a predetermined maximum time duration to supply additional power to the load for said time duration; and second manually operable means for selectively actuating said circuit means; and
means to override said circuit means to prevent energizing the load at said given voltage for only a predetermined period of time immediately following cessation of operation of the load at said given voltage.

3. A control according to claim 2 wherein:
said second manually operable means includes a manually operable switch.

4. A load control circuit comprising:
input terminals adapted to be connected to a source of pulsating current;
a load;
a solid state controlled conduction device in series circuit relation with said load input terminals, said controlled conduction device having a control electrode;
first control circuit means connected to said input terminals and to said control electrode to turn said controlled conduction device on at a certain time during each cycle of said pulsating current;
a selectively operable control element connected to said control electrode;
second control circuit means connected to said control element and effective to produce a signal at said control electrode sufficient to turn said controlled conduction device on at a time, during each cycle of pulsating current, earlier than said certain time:
only when said load is in an overload condition of at least a predetermined extent,
only for a period of time including at least several cycles of said pulsating current, and
only when said selectively operable control element is in an operating condition;
said second circuit means including timing means to render said control circuit means ineffective to produce another signal equal in time to said period of time, during an interval of time immediately following said period of time.

5. A load control circuit according to claim 4 wherein:
said load is the motor of a power tool; and
said selectively operable control element is a trigger operated switch.

6. A load control circuit according to claim 4 wherein:
said controlled conduction device is a thyristor; and
said control electrode is a gate electrode of said thyristor.

7. A load control circuit according to claim 6 wherein:
said first control circuit means includes a timing circuit having a variable resistor and a capacitor in series with said resistor;
said load is the motor of a power tool;
said first control circuit means includes a trigger switch manually operable:
to a first condition in which said first control circuit means turns said controlled conduction device on at said certain time,
to a second condition in which the resistance of said variable resistor is changed to turn said controlled conduction device on at a time earlier than said certain time during each cycle of said pulsating current, and
to a third condition in which said selectively operable control element is in said operating condition.

8. A load control circuit comprising:
input terminals adapted to be connected to a source of pulsing current;
a load;
a thyristor in series circuit relation with said load and input terminals, said thyristor having a gate electrode;
a selectively operable control element controllably connected to said gate electrode;
control circuit means connected to said control element and effective to produce a signal at said gate electrode sufficient to turn said thyristor on substantially at the beginning of each cycle of pulsating current,
only when said load is in an overload condition of at least a predetermined extent,
only for a predetermined period of time including at least several cycles of said pulsating current, and
only when said selectively operable control element is in an activated condition;
said control circuit means including timing means to render said control circuit means ineffective to produce another signal equal in time to said predetermed period of time, during an interval of time immediately following said predetermined period of time.

9. A load control circuit according to claim 8 wherein:
said selectively operable control element is a switch; and
said thryistor is gated on at substantially the beginning of each cycle of pulsating current only when said switch is closed. , 10. A load control circuit according to claim 9 wherein:
said timing means includes:
an impedance and a reactance in series circuit relation with said switch.

11. A load control circuit according to claim 8 wherein:
said input terminals are adapted to be connected to a source of alternating current;
said thryistor is a triac; and
said control circuit means gates said triac on at substantially the beginning of each positive and negative half cycle of said alternating current.

12. A control circuit according to claim 8 wherein:
said timing means includes a resistor and a capacitor;
a transistor is connected between said gate electrode and one of the terminals of said thyristor;
said selectively operable control element is connected between said transistor and the junction of said resistor and capacitor; and
which further includes:
current sensing means to sense the current in said load, and
means responsive to said current sensing means to bias said transistor to an enabling condition in which said transistor conducts sufficiently, whenever said manually operated switch is closed, to gate said thyristor on.

13. In combination with a portable electric drill or appliance having a housing,
handle means on the housing, adapted to be grasped by the operator;
an electric motor within the housing; said motor being designed for normal operation at a first energization level;
first and second control means in juxtaposition to the handle means for convenient engagement by the operator without substantially altering his grip on the handle means;
first circuit means responsive to manual actuation of said first control means to normally energize the load at said first energization level;
second circuit means responsive to manual actuation of said second control means to occasionally energize the load at a second energization level higher than said first energization level; and
further means for preventing excessive application of said second energization level, thereby protecting the motor against adverse overload;
said further means including means to prevent application of said second energization level for more than a predetermined period of time.

14. The combination of claim 13 wherein:
said second control means can be manually actuated only when said first control means is actuated.

15. The combination of claim 13 wherein:
said second circuit means can be actuated by said second control means only when said first control means is in an actuated condition.

References Cited

UNITED STATES PATENTS

| | | | |
|---|---|---|---|
| 3,187,248 | 6/1965 | Cardin | 317—13X |
| 3,379,950 | 4/1968 | Friedline | 318—434 |
| 3,209,228 | 9/1965 | Gawron | 318—345 |
| 3,271,648 | 9/1966 | Weed | 318—331 |
| 3,443,188 | 5/1969 | Mortimer | 318—332 |

ORIS L. RADER, Primary Examiner

R. J. HICKEY, Assistant Examiner

U.S. Cl. X.R.

317—13; 318—434

UNITED STATES PATENT OFFICE
CERTIFICATE OF CORRECTION

Patent No. 3,564,372    Dated Feb. 16, 1971

Inventor(s) Walter H. Vogelsberg and Alexander C. R. Wil

It is certified that error appears in the above-identified paten and that said Letters Patent are hereby corrected as shown below:

In column 2, line 13, "coud" should read --- could ---; line 26, "volt" should read --- voltage ---. In column 4, line 33, "operatior" should read --- operator ---; line 50 between "control" and "satisfying", the word --- circuit --- should be inserted. In column 6, line 9, "ands" should re --- and ---; line 69, the numeral "29" should read --- 27 at column 9, line 26, "or" should read --- of ---;

line 38, "$T_7$" should read --- $T_8$ --- at column 10, line 27, "of" should read --- by ---. At column 13, line 34, "control" should read --- second ---.

Signed and sealed this 27th day of June 1972.

(SEAL)
Attest:

EDWARRD M. FLETCHER, JR.          ROBERT GOTTSCHALK
Attesting Officer                 Commissioner of Patents